Jan. 22, 1963   J. W. DAVIDSON   3,074,415
THRESHER
Filed March 14, 1960   2 Sheets-Sheet 1

INVENTOR
JOSEPH W. DAVIDSON
BY
ATTORNEY

INVENTOR
JOSEPH W. DAVIDSON
ATTORNEY

United States Patent Office 3,074,415
Patented Jan. 22, 1963

3,074,415
THRESHER
Joseph W. Davidson, Chesterfield, Va., assignor to American Machine & Foundry Company, a corporation of New Jersey
Filed Mar. 14, 1960, Ser. No. 14,712
6 Claims. (Cl. 131—145)

This invention relates to an apparatus for threshing tobacco leaves.

In threshing apparatus presently available, when the quantity of tobacco being fed to the thresher is changed or the type of tobacco is changed, it is necessary to change either the toothed rotor or the concave surrounding the rotor to provide teeth and openings which will most efficiently thresh the tobacco leaves. If this is not done, then the separating or tearing efficiency of the thresher is materially changed so that a higher percentage of leaves has to go through the threshing operation a second time. This is objectionable because the size of the tobacco pieces sometimes is made much smaller than desired by this reprocessing.

It is therefore an object of this invention to provide a thresher which can be employed with a wide variety of quantities of tobacco and lengths of tobacco without requiring the machine to be stopped and the concave and toothed rotor changed to handle a different quantity or different type of tobacco.

A further object of this invention is to provide a gate structure for a perforated concave which can be opened or closed to obtain the maximum separating efficiency for any given quantity or type of tobacco.

Another object of this invention is to provide a concave wherein the openings between the teeth of the concave will be graduated.

Another object is to provide a concave having interfingering teeth as well as a graduated spacing arrangement between the interfingering teeth.

A further object of this invention is to provide closing gates that can be moved into and out of adjacent with a perforated threshing concave so as to activate or inactivate a portion of the concave.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

Figure 1:
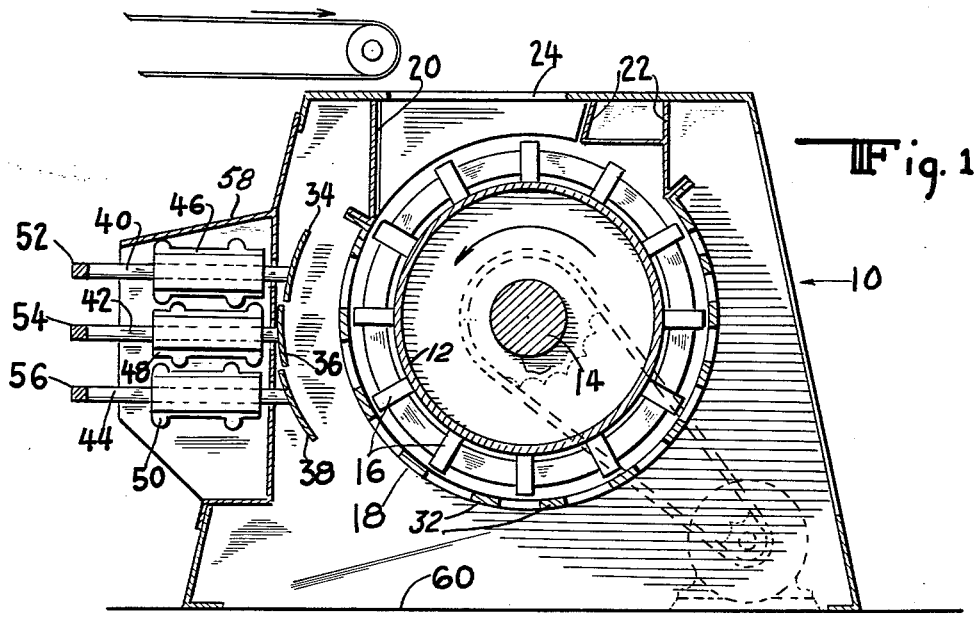
FIG. 1 is a side elevation of my thresher with the gates in open position.
Figure 2:
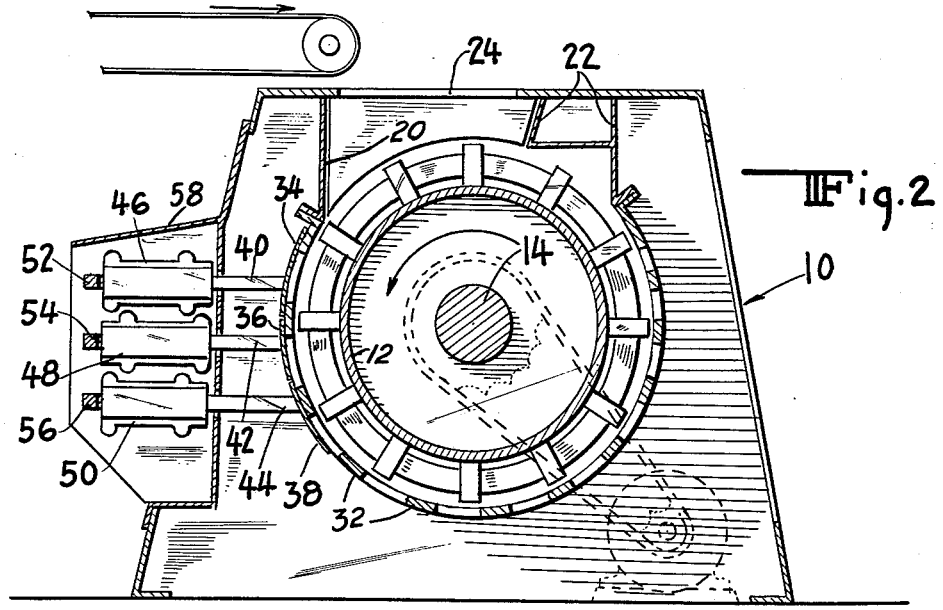
FIG. 2 shows a side elevation of my thresher with the gates in closed position.
Figure 3:
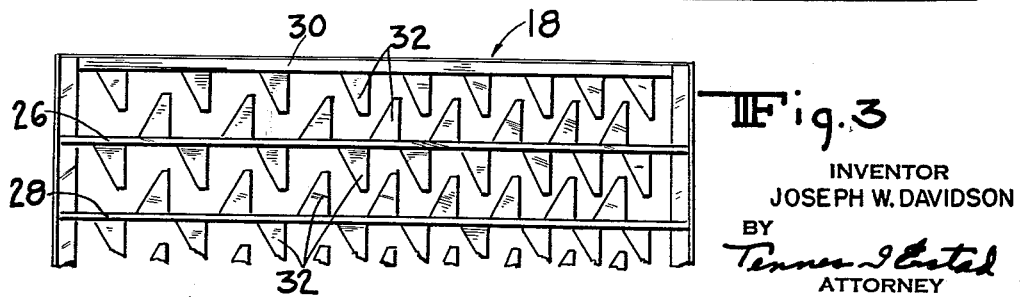
FIG. 3 shows a front elevation of the concave laid out in a flat pattern.

The threshing apparatus consists of a housing 10 having a rotary drum 12 supported at opposite ends in the housing 10. A shaft 14 extends through one of the walls of the housing 10 and is driven from a suitable source of power to cause the thresher drum to rotate in the direction indicated by the arrow. The drum 12 has projecting from its surface teeth 16. A perforate concave 18 such as shown in FIG. 3 surrounds the curved path of travel of the teeth 16. The curved concave 18 is connected with support walls 20 and 22 as shown in FIGS. 1 and 2. Tobacco to be threshed is delivered to the thresher through the opening 24. The concave 18 may be formed with longitudinal ribs 26, 28 and 30. Suitable extensions such as the triangular teeth 32 extend at predetermined intervals from the ribs 26, 28 and 30. The teeth 32 have a graduated spacing so that the teeth at the upper end of the concave are spaced at a greater distance from each other than the teeth at the lower side of the concave as shown in FIG. 3. The adjacent teeth are also arranged so that they interfinger with the teeth on the opposing rib support.

Suitable closing gates are positioned on one side of the curved concave 18 as shown in FIGS. 1 and 2. Each of the gates 34, 36 and 38 are supported on the end of a slide bar 40, 42 and 44 respectively. The slide bars are mounted in suitable bearing supports 46, 48 and 50 respectively. A suitable actuating handle 52, 54 and 56 is provided for each slide bar to enable the gates 34, 36 and 38 to be individually moved into open position as shown in FIGURE 1 or into closed position as shown in FIGURE 2. The slide supports 46, 48 and 50 are mounted in a suitable enclosure 58 which is suitably secured to one side of the housing 10. The closing gates 34, 36 and 38 are preferably mounted adjacent that part of the concave which has the largest size gradation of the spacing between the teeth 32 as shown in FIGURES 1 and 2.

The operation of my invention may be briefly described as follows: Tobacco to be threshed is fed by suitable means such as a chute or conveyor belt continuously into the opening 24. The tobacco so fed falls downwardly into the range of action of the rotating drum 12 carrying the spiked projections 16. As the tobacco leaves are carried by the projections 16 past the concave 18, they tend to be hurled outwardly against the teeth 32 of the concave which in turn causes the stem portion of the leaf to be torn away from the lamina portion of the leaf. The tobacco leaves so torn pass through the openings of the concave and descend downwardly through the opening 60. The tobacco so falling through the opening 60 is then collected in any suitable manner such as by a conveyor belt by means of which it is transported to the next processing operation.

It will be noted that the greatest amount of tobacco will be found between the rotating drum 12 and the concave 18 at the point where it enters inbetween these two elements. As the tobacco continues progressing along the concave 18, with the pronged elements 16, some of the tobacco leaves will become torn and will pass out through the spaces between the teeth 32 of the concave. As a consequence, as the quantity of tobacco diminishes, it has been found desirable to narrow the distance between the teeth 32 and the threshing efficiency of applicant's thresher is therefore maintained consistent even though the quantity of tobacco between the threshing walls have been changed.

When the quantity or type of tobacco leaves to be threshed entering the opening 24 is changed, then the threshing efficiency of the thresher would also automatically change. Heretofore, when this occurred in the manufacturing process, it was necessary to change either the drum 12 or the number and spacing of the teeth 16 thereon. To do this, the concave 18 was removed and a concave having a different number and arrangement of teeth was substituted. This was objectionable because it not only took a great deal of time but it necessitated maintaining auxiliary parts available with a thresher.

Your applicant has avoided these difficulties by means of his shut-off gates 34, 36 and 38 which in combination with the variable gradation in the spacing between teeth 32 he is able to accomplish the same result without modifying the structural elements of his thresher. Therefore, whenever a change of type leaf or a change of tobacco quantity fed through the opening 24 occurs, the operator merely has to close off a portion of the concave. For example, when the quantity of tobacco fed through the opening 24 is decreased, there would be less tearing of the leaves by the larger graduated spacing between the teeth 32 at the beginning of the threshing operation. As a consequence, some of the leaves to be torn would fall through these openings without having had the stems torn from the lamina.

Applicant overcomes this in his apparatus by merely pushing on the handle 52 which brings the gate 34 into contact with the area of the concave having the largest spacings. If this correction is not sufficient then the second closing gate 36 is likewise pushed into closed position by means of the handle 54. Similarly, an additional correction can be made by pushing the closing gate 38 into its position by means of handle 56 as shown in FIGURE 2.

When the closing gates have thus been moved into position as shown in FIGURE 2, only the remaining portion of the concave remains active and this portion of the concave has smaller spacings between the teeth 32 which would correspond to the quantity of tobacco normally found between the drum 12 and this portion of the concave 18 had a normal quantity of tobacco leaves to be torn been fed through the opening 24. It will thus be evident, that by means of my apparatus I have been able to maintain the separating efficiency of my thresher even though the quantity of tobacco or the kind of tobacco leaves are varied.

I have therefore accomplished my objective of providing a unitary thresher which is adaptable to threshing efficiently different quantities of tobacco and different kinds of leaves without the necessity of making any structural additions or subtractions to the thresher, but instead by merely rearranging the components within the thresher. I have further accomplished my objective of employing devices which are of a simple design so as to avoid materially increasing the cost of such a diversified thresher and which will be of a design that there is very little likelihood of its failing to operate satisfactorily.

Figure 4:
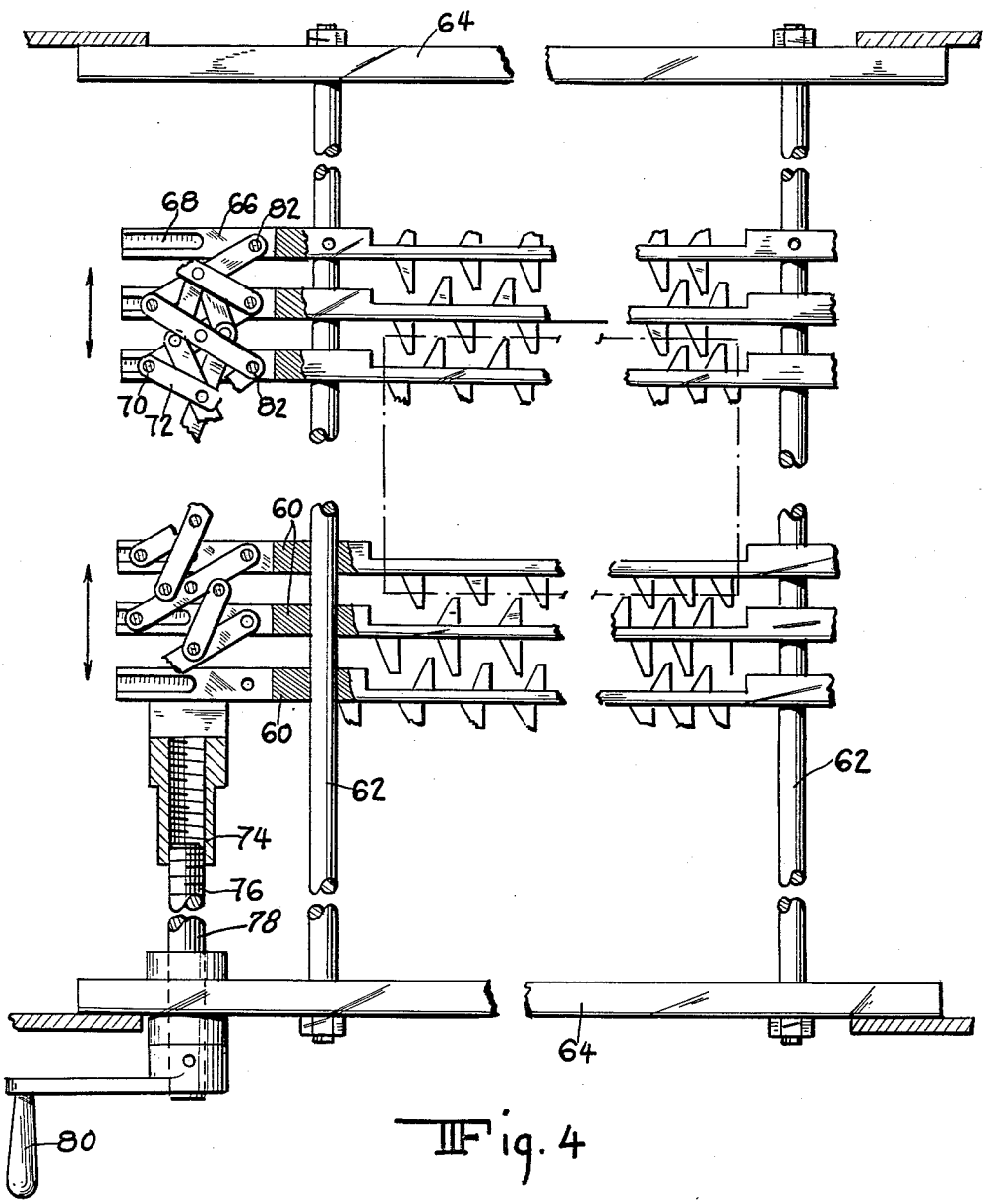
FIG. 4 is a front elevation, laid out in a flat pattern, of another concave.

In the embodiment shown in FIG. 4 means are provided for varying the distance between the ribs in the concave and hence changing the effective distance between the teeth mounted thereon.

Each rib illustrated in FIG. 4 is provided with a pair of spaced lugs 60 slidingly engaging with a pair of horizontal rods 62 held at each end by a suitable frame member 64.

Each lug 60 is also provided with a U-shaped cutout 66, each leg thereof being provided with a slot 68. Slots 68 are employed for the purpose of slidingly engaging with suitable pins 70, carried by and projecting from the ends of a plurality of links 72 constituting a lazy-tong structure identical to the one shown and illustrated in patent application, Serial No. 834,102 filed August 17, 1959, by Harry N. Niebuhr, now Patent No. 3,003,531.

Each lug 60 on the innermost or end rib is stationarily secured to the rods 62, while to each lug 60 attached to the front rib, is secured a threaded sleeve 74, which engages with the threaded portion 76 of a rotatable shaft 78, the front end of which is mounted in a suitable bearing of frame structure 64.

Each of the two shafts 78 (only one of which is shown) is also provided with a handle 80, which, when turned in a clockwise or counterclockwise direction, will effect a movement of the teeth-carrying ribs in such a manner as to increase or decrease the space between said teeth. While pins 70, projecting from an end of the link 72 of the lazy-tong structure slidably engages with the slot 68 of cutout 66, the pins 82 projecting from the opposite ends of said links only form a stationary pivot. This feature aids in regulating the final size of the torn tobacco leaves, and in maintaining constant the threshing efficiency of the instant thresher.

It will be appreciated that this modification may be used alone or in conjunction with the previously described closing-gate structure or that part of the gate structure adjacent to the teeth having the smallest spacing may be omitted. In effect, bringing together the various ribs will incapacitate that part of the concave having closely spaced teeth which will therefore intermesh to close a part of the concave.

The invention hereinabove described may therefore be varied in construction within the scope of the claims, for the particular devices selected to illustrate the invention are but two of many possible embodiments of the same. The invention, therefore, is not to be restricted to the precise details of the structures shown and described.

What is claimed is:

1. A thresher for tobacco leaves comprising a housing having a feed opening therein, a toothed threshing rotor rotatably mounted in said housing below said feed opening, outlet means below said rotor, an open, curved concave secured in said housing and surrounding a portion of the path of travel of said rotor, said concave having a plurality of spaced longitudinal ribs bearing spaced teeth, the spacings between said teeth being progressively smaller in the direction of movement of said rotor, adjacent teeth on opposing ribs being in interfingering relationship, an enclosure secured on one side of said housing at a predetermined distance from said concave, slide supports mounted in said enclosure and bearing individually movable slide bars, closing means adjacent to said concave and connected to said slide bars for selectively incapacitating sections of said concave.

2. The thresher of claim 1, wherein said teeth in said concave are triangular.

3. The thresher of claim 1, wherein said closing means are positioned adjacent that part of said concave having the largest spacing between the teeth thereof.

4. The thresher of claim 1, wherein said closing means consist of a plurality of individually operated closing gates.

5. A thresher for tobacco leaves comprising a housing, a threshing drum rotatably mounted therein, an open concave member surrounding a portion of the path of travel of said drum, said housing having an opening above said drum for feeding thereto leaves to be threshed and an opening below said drum communicating with said concave member, said concave member having ribs slidably mounted therein for varying the distance between said ribs, said ribs having interfingering teeth having graduated spacing diminishing progressively in the direction of motion of said drum, and an individually movable slidable gate structure adjacent said teeth for closing a selected portion thereof.

6. The thresher of claim 5 wherein lazy tongs are operatively connected to said ribs for varying the distance therebetween.

References Cited in the file of this patent

UNITED STATES PATENTS

| | | |
|---|---|---|
| 669,150 | Strickler | Mar. 5, 1901 |
| 953,845 | Knaak | Apr. 5, 1910 |
| 1,698,758 | Knittel | Jan. 15, 1929 |
| 1,949,534 | Doyle | Mar. 6, 1934 |
| 2,127,329 | Eissmann | Aug. 16, 1938 |
| 2,345,988 | Ockrant | Apr. 4, 1944 |
| 2,375,231 | Kottmann | May 8, 1945 |
| 2,701,570 | Eissmann | Feb. 8, 1955 |
| 2,789,564 | Hunter | Apr. 23, 1957 |
| 2,984,246 | Eissmann et al. | May 16, 1961 |

FOREIGN PATENTS

| | | |
|---|---|---|
| 713,466 | Germany | Nov. 11, 1941 |
| 44,914 | Sweden | Jan. 8, 1919 |